(12) United States Patent
Yang et al.

(10) Patent No.: US 12,036,832 B2
(45) Date of Patent: Jul. 16, 2024

(54) SYSTEMS AND METHODS FOR TETHERING AN AUTONOMOUS ELECTRIC-POWERED TRAILER TO A TOWING NEXUS

(71) Applicant: Pebble Mobility, Inc., Sunnyvale, CA (US)

(72) Inventors: Bingrui Yang, Los Altos, CA (US); Stefan Solyom, Los Altos, CA (US)

(73) Assignee: Pebble Mobility, Inc., Sunnyvale, CA (US)

( * ) Notice: Subject to any disclaimer, the term of this patent is extended or adjusted under 35 U.S.C. 154(b) by 23 days.

(21) Appl. No.: 18/128,633

(22) Filed: Mar. 30, 2023

(65) Prior Publication Data
US 2023/0331050 A1   Oct. 19, 2023

Related U.S. Application Data

(60) Provisional application No. 63/345,968, filed on May 26, 2022, provisional application No. 63/332,254, filed on Apr. 18, 2022.

(51) Int. Cl.
*B60D 1/00* (2006.01)
*B60D 1/36* (2006.01)
*G05D 1/00* (2006.01)

(52) U.S. Cl.
CPC ............. *B60D 1/36* (2013.01); *G05D 1/0287* (2013.01)

(58) Field of Classification Search
CPC ................................ B60D 1/36; G05D 1/0287
USPC ........................................................... 701/23
See application file for complete search history.

(56) References Cited

U.S. PATENT DOCUMENTS

| | | | |
|---|---|---|---|
| 10,744,943 B1 * | 8/2020 | Jales Costa | ............... G06T 7/70 |
| 2019/0210479 A1 * | 7/2019 | Bachmann | ............ B60L 53/665 |
| 2020/0298639 A1 * | 9/2020 | Niewiadomski | ... B62D 15/0285 |
| 2022/0144058 A1 * | 5/2022 | Ben-Ari | .................... F16D 1/10 |

* cited by examiner

*Primary Examiner* — Tiffany P Ohman
(74) *Attorney, Agent, or Firm* — Padowithz Alce; Quintin Scheitlin; Alce PLLC

(57) ABSTRACT

A method for autonomously tethering an autonomous electric powered trailer to a tethering partner includes identifying a target tethering partner for the autonomous electric powered (AEP) trailer, detecting a likely n-dimensional position of a tethering nexus of the target tethering partner based on an assessment of sensor data; computing, a set of automated tethering instructions based on the likely n-dimensional position of the tethering nexus; and autonomously tethering, via the one or more computers, a coupler of the AEP trailer to the tethering nexus based on executing the set of automated tethering instructions.

20 Claims, 3 Drawing Sheets

┌ ─ ─ ─ ─ ─ ─ ─ ─ ─ ─ ─ ─ ─ ─ ─ ┐
│ Establishing a Tethering Proximity 205 │
└ ─ ─ ─ ─ ─ ─ ─ ─ ─ ─ ─ ─ ─ ─ ─ ┘

Sourcing Sensor Data S210

Computing Alignment Parameters S220

Computing Autonomous Movement Parameters S230

Executing Autonomous Operations S240

SYSTEMS AND METHODS FOR TETHERING AN AUTONOMOUS ELECTRIC-POWERED TRAILER TO A TOWING NEXUS

CROSS-REFERENCE TO RELATED APPLICATIONS

This application claims the benefit of U.S. Provisional Application No. 63/332,254, filed 18 Apr. 2022, and U.S. Provisional Application No. 63/345,968, filed 26 May 2022, which are incorporated herein in their entireties by this reference.

TECHNICAL FIELD

This invention relates generally to the autonomous electric trailer field, and more specifically to a new and useful system and method for automated tethering of an automated electric trailer to a tow vehicle in the autonomous electric trailer field.

BACKGROUND

Modern vehicle trailer design and technology appear to be misaligned with the evolution, current technologies and designs of towing vehicles. In particular, standard vehicle trailers are designed to be passive entities that only move or stop when forces generated by a tow vehicle acts on these trailers. However, as a significant sum of modern vehicles are transitioning to alternative powering mechanisms (e.g., electric power) for driving and operating these modern vehicles, driving range often becomes a concern when a passive trailer is in tow. Similarly, lesser towing-capable vehicles (e.g., sedans or the like) that may use typical combustion engines may have difficulty towing standard trailers carrying challenging loads.

Additionally, various other headwinds caused by standard vehicle trailers include complications and difficulties in attaching the trailer to the tow vehicle. Typically, in order to connect a trailer to a tow vehicle, a user has to back up or move a tow vehicle into a position towards a trailer and further, create alignment between the tow vehicle and a coupling mechanism of the trailer. The traditional connection process is tedious and oftentimes involves multiple attempts and/or adjustments by the user to create a successful connection between the tow vehicle and trailer.

In the present application, one or more implementations of the invention provide methods and systems for an autonomous and assistive movement of an electric-powered trailer and for an autonomous tethering or hitching of the electric-powered trailer to a towing hitch or similar towing mechanism of a tow vehicle.

Thus, there is a need in the autonomous electric trailer field to create new and useful methods and systems for an autonomous and assistive movement of an electric-powered trailer and for an autonomous tethering or hitching of the electric-powered trailer to a towing hitch or similar towing mechanism of a tow vehicle.

The embodiments of the present application described herein provide technical solutions that address, at least, the need described above.

BRIEF SUMMARY OF THE INVENTION(S)

In some embodiments, a method for implementing an automated tethering of an autonomous electric powered trailer and a tow vehicle includes: identifying, via one or more computers, a target tethering partner for an autonomous electric powered (AEP) trailer; identifying, by the AEP trailer, an n-dimensional position of a tethering nexus of the target tethering partner based on an assessment of sensor data; computing, via the one or more computers, a set of automated tethering instructions based on the identifying the n-dimensional position of the tethering nexus, wherein: (1) a first subset of the automated tethering instructions, when executed, causes the AEP trailer to autonomously maneuver into a state of alignment with the tethering nexus of the target tethering partner; and (2) a second subset of the automated tethering instructions, when executed, autonomously maneuvers the AEP trailer into a target coupler-to-tether arrangement that arranges a coupler of the AEP trailer adjacent to the n-dimensional position of the tethering nexus; and autonomously tethering, via the one or more computers, the coupler of the AEP trailer to the tethering nexus based on executing the set of automated tethering instructions.

In some embodiments, the AEP trailer comprises a steering component and one or more distinct motors operatively connected to one or more wheels of the AEP trailer, the set of automated tethering instructions at least include: (a) one or more motor control instructions for controlling a movement of the AEP trailer via the one or more wheels; and (b) one or more steering control instructions for controlling a steering direction of the steering component of the AEP trailer, and autonomously tethering the coupler of the AEP trailer to the tethering nexus includes: operating, via the one or more computers, each motor of the AEP trailer at a target voltage based on the one or more motor control instructions and the one or more steering control instructions.

In some embodiments, computing the set of automated tethering instructions includes: (i) identifying, via the one or more computers, an n-dimensional position of the coupler of the AEP trailer based on the assessment of the sensor data; and (ii) computing, via the one or more computers, at least one of (a) one or more motor control instructions, (b) one or more braking control instructions, (c) one or more steering control instructions, and (d) one or more jack control instructions that, when executed, causes the n-dimensional position of the coupler to align with the n-dimensional position of the tethering nexus.

In some embodiments, the tethering nexus emits an alignment traveling boundary signal, and computing the set of automated tethering instructions include: (a) identifying, via the one or more computers, an n-dimensional position of the coupler of the AEP trailer based on the assessment of the sensor data; (b) identifying, via the one or more computers, a vertex of the alignment traveling boundary signal; and (c) computing, via the one or more computers, at least one of (i) one or more motor control instructions, (ii) one or more braking control instructions, and (iii) one or more steering control instructions that, when executed, causes the n-dimensional position of the coupler to align with the vertex of the alignment traveling boundary signal.

In some embodiments, the target coupler-to-tether arrangement is achieved when the coupler of the AEP trailer is located at a pre-determined tether connection point associated with the tethering nexus, and computing the set of automated tethering instructions include: (i) identifying, via the one or more computers, an n-dimensional position of the pre-determined tether connection point associated with the tethering nexus; (ii) identifying, via the one or more computers, an n-dimensional position of the coupler of the AEP trailer based on the assessment of the sensor data; and (iii)

computing, via the one or more computers, at least one of (a) one or more motor control instructions, (b) one or more braking control instructions, (c) one or more steering control instructions, and (d) one or more jack control instructions that, when executed, causes the n-dimensional position of the coupler to align with the vertex of the alignment traveling boundary signal.

In some embodiments, the set of automated tethering instructions further include: (3) a third subset of automated tethering instructions that, when executed, causes the coupler of the AEP trailer to physically connect the coupler of the AEP trailer to the tethering nexus.

In some embodiments, the third subset of automated tethering instructions include one or more jack control instructions that, when executed, causes a movement of the coupler of the AEP trailer from a pre-determined tether connection point to the n-dimensional position of the tethering nexus.

In some embodiments, the AEP trailer comprises a plurality of motors and a plurality of wheels, each motor of the AEP trailer operatively controls a distinct wheel of the AEP trailer, and computing the set of automated tethering instructions includes computing a distinct set of automated tethering instructions for each distinct motor of the AEP trailer.

In some embodiments, the AEP trailer comprises one or more wheel pairs, each distinct wheel pair is controlled by a distinct motor of the AEP trailer, and the set of automated tethering instructions define a target voltage (or propulsion) for the distinct motor associated with each distinct wheel pair.

In some embodiments, the AEP trailer is an un-tethered state when the coupler of the AEP trailer is not physically connected to the tethering nexus, the AEP trailer moves from the un-tethered state to a tethering state when the one or more computers are executing the set of automated tethering instructions, and the AEP trailer moves from the tethering state to a tethered state when the coupler of the AEP trailer is physically connected to the tethering nexus.

In some embodiments, the method further comprises terminating or pausing the autonomous tethering of the coupler of the AEP trailer to the tethering nexus based on detecting a potential collision with an object.

In some embodiments, autonomously tethering the coupler of the AEP trailer to the tethering nexus includes one or more feedback loops, the one or more feedback loops continuously perform autonomous tethering computations until (a) the coupler of the AEP trailer is physically connected to the tethering nexus or (b) a stopping condition is satisfied, and the one or more feedback loops include: (i) the identifying the n-dimensional position of the tethering nexus, (ii) the computing the set of automated tethering instructions, and (iii) the executing the set of automated tethering instructions.

In some embodiments, identifying the target tethering partner includes: computing, via the one or more computers, one or more likely tethering partners; surfacing, via the one or more computers, the one or more likely tethering partners to a user; and selecting, via the one or more computers, one of the one or more likely tethering partners as the target tethering partner based on a user confirmation input.

In some embodiments, the target tethering partner is automatically selected by the AEP trailer, and automatically selecting the target tethering partner includes: (a) detecting, via the one or more computers, a potential tethering partner for the AEP trailer; (b) computing, via the one or more computers, a distance between the potential tethering partner and the AEP trailer; and (c) selecting the potential tethering partner as the target tethering partner if the distance satisfies a tethering proximity threshold.

In some embodiments, the target tethering partner is selected by a user, and selecting the target tethering partner includes: (i) receiving, via the one or more computers, one or more inputs identifying a target tethering object; and (ii) selecting, via the one or more computers, the target tethering object as the target tethering partner for the AEP trailer.

In some embodiments, the method further comprises: detecting, via the one or more computers, a current state of alignment between the AEP trailer and the tethering nexus, wherein detecting the current state of alignment between the AEP trailer and the tethering nexus includes: (1) capturing, via one or more cameras, an image of a scene containing the AEP trailer and the target tethering partner; (2) detecting, via a machine learning object detection model, the coupler of the AEP trailer and the tethering nexus based on model input comprising the image; (3) deriving, via the one or more computers, an n-dimensional position of the coupler of the AEP trailer and an n-dimensional position of the tethering nexus based on the detecting; and (4) computing, via the one or more computers, the current state of alignment between the AEP trailer and the tethering nexus based on an assessment of the n-dimensional position of the AEP trailer against the n-dimensional position of the tethering nexus.

In some embodiments, a method for implementing an automated tethering of an autonomous electric powered trailer to a tethering partner, the method comprising: identifying, via one or more computers, a target tethering partner for an autonomous electric powered (AEP) trailer; identifying, by the AEP trailer, a likely n-dimensional position of a tethering nexus of the target tethering partner based on an assessment of sensor data; computing, via the one or more computers, a set of automated tethering instructions based on the identifying the likely n-dimensional position of the tethering nexus, wherein the automated tethering instructions, when executed, cause the AEP trailer to: (1) autonomously maneuver into a state of alignment with the tethering nexus of the target tethering partner; and (2) autonomously maneuver into a target coupler-to-tether arrangement that arranges a coupler of the AEP trailer adjacent to the n-dimensional position of the tethering nexus; and autonomously tethering, via the one or more computers, the coupler of the AEP trailer to the tethering nexus based on executing the set of automated tethering instructions.

In some embodiments, the target coupler-to-tether arrangement is achieved when the coupler of the AEP trailer is located at a pre-determined tether connection point associated with the tethering nexus, and the set of automated tethering instructions include at least one of: (a) one or more motor control instructions, (b) one or more steering control instructions, (c) one or more brake control instructions, and (d) one or more jack control instructions for moving the coupler of the AEP trailer to the pre-determined tether connection point.

In some embodiments, identifying the likely n-dimensional position of the tethering nexus includes computing, via the one or more computers, a likely X-position, Y-position, or Z-position of the tethering nexus, and the AEP trailer and tethering nexus are determined to be in the state of alignment when an X-position, Y-position, or Z-position of the AEP trailer aligns with the likely X-position, Y-position, or Z-position of the tethering nexus.

In some embodiments, a method for autonomously tethering an autonomous electric powered trailer to a tethering partner includes: identifying, via one or more computers, a target tethering partner for an autonomous electric powered (AEP) trailer, wherein the target tethering partner comprises a tethering nexus; detecting, via the one or more computers, a likely n-dimensional position of the tethering nexus based on an assessment of sensor data; computing, via the one or more computers, a set of automated tethering instructions based on the likely n-dimensional position of the tethering nexus; and autonomously tethering, via the one or more computers, a coupler of the AEP trailer to the tethering nexus based on executing the set of automated tethering instructions, wherein autonomously tethering the coupler of the AEP trailer to the tethering nexus includes autonomously connecting the coupler of the AEP trailer to the tethering nexus of the target tethering partner.

DESCRIPTION OF THE PREFERRED EMBODIMENTS

The following description of the preferred embodiments of the invention(s) is not intended to limit the invention(s) to these preferred embodiments, but rather to enable any person skilled in the art to make and use the invention(s).

1. Autonomous Electric-Powered Trailer System

Figure 1:
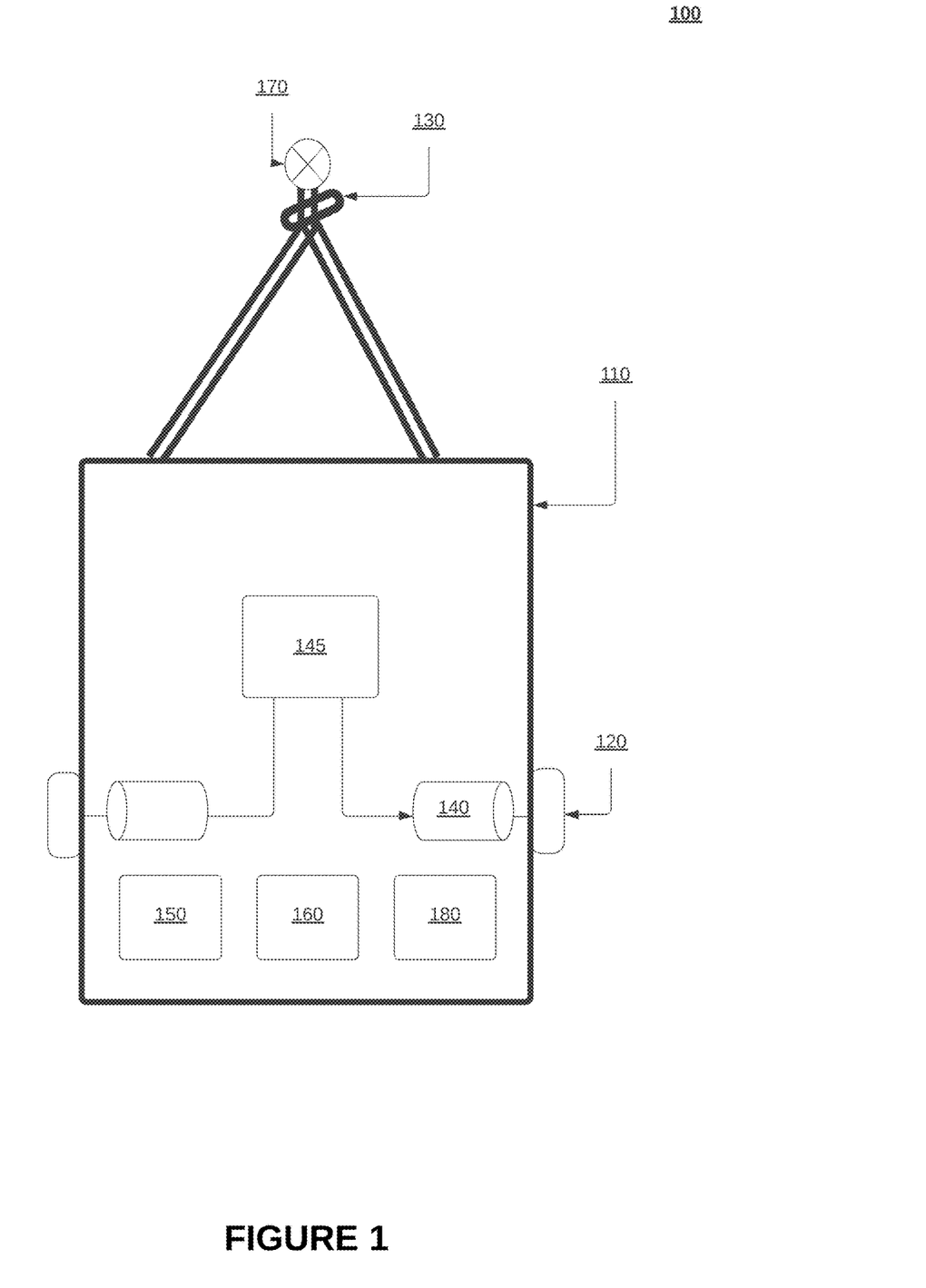
FIG. 1 illustrates a schematic representation of a system 100 in accordance with one or more embodiments of the present application.

As shown by reference to FIG. 1, an autonomous electric-powered trailer system 100 for assistive driving transport with a tow entity (e.g., a tow vehicle) and, in some circumstances, while detached from a tow entity, autonomous transport or movement may include a chassis 110 of an AEP trailer system 100, a plurality of wheels 120 (motorized/unmotorized), a steerable axle/caster wheel 130, one or more electric motors 140 powered by a battery subsystem 145, sensor suite 150, an autonomous trailer control subsystem 160, a coupler (e.g., tow vehicle hitch receiver) 170, and a communication subsystem 180.

The autonomous electric-powered trailer system 100 may preferably be implemented in conjunction with a tow vehicle or the like having an independent propulsion system. In a tethered driving operation, an autonomous driving behavior of the AEP trailer system 100 may be responsive to and/or informed by an initial driving behavior of the tow vehicle. In such cases, the one or more sensing devices 150 of the AEP trailer system 100 may operate to identify driving activity and/or operations of a tow vehicle tethered to the AEP trailer system 100 and responsively computer autonomous movement and/or driving control instructions for the AEP trailer system 100.

1.10 Trailer Chassis

The chassis 110 of the AEP trailer system 100 preferably comprises a load-bearing framework of an artificial object that preferably structurally supports the artificial object in its construction and function. That is, in some embodiments, the chassis 110 may be an undercarriage used to transport a load or container over the road. In one or more embodiments, the chassis no may include a frame having a composition of one or more materials, which may include a combination of metals (e.g., steel) and/or wood-based components. The chassis 110 preferably additionally includes one or more axles that support the attachment of the plurality of wheels 120 and the caster wheel 130, a trailer tongue or the like that extends from a main body of the chassis, a coupler arranged at a distal end of the trailer tongue, a cranking or jacking mechanism arranged along the trailer tongue.

1.20 Wheels

The plurality of wheels 120 of the AEP trailer system 100 are preferably attached to the one or more axles of the chassis 110. In some embodiments, the plurality of wheels 120 may be powered by and/or include the one or more motors 140 and may include a braking system. The braking system, as generally referred to herein, may implement any suitable technique for slowing or stopping the AEP trailer system 100 including, but not limited to, hydraulic braking systems, electric braking systems, regenerative braking systems, disk-based brake systems, drum-based brake systems, or the like.

In a first implementation, each of the plurality of wheels 120 or a subset of the plurality of wheels 120 may include or may be powered at least one of the one or more motors 140. In this first implementation, the at least one motor of a given wheel may be independently powered and operated to enable an independent movement of the given wheel. While the at least one motor may enable an independent operation of the given wheel, it shall be recognized that each motor of each wheel may be operated in coordination or in concert to enable various driving operations of the AEP trailer system 100.

In a second implementation, each pair (i.e., left wheel/right wheel defining a pair) of the plurality of wheels 120 may be powered by a single motor of the one or more motors 140. In such embodiments, the single motor may be arranged along an axle onto which each distinct wheel of the pair of wheels may be arranged each respective end of the axle. In this second implementation, the pair of wheels may be operated in a coordination based on an operation of the single motor.

It shall be recognized that in some embodiments, the AEP trailer system 100 may include a plurality of axles in which only a subset of the plurality of axles includes the one or more motors 140.

1.30 Steerable Axle|Caster Wheel

The steerable axle 130 preferably functions to support or enable directional movements of the AEP trailer system 100. In one or more embodiments, the steerable axle 130 includes a caster wheel. In one implementation, the steerable axle 130 may be powered by an independent motor of the one or more motors 140 arranged along the steerable axle 130 to rotate the caster wheel. In another implementation, the steerable axle 130 may be passive and a movement of the caster wheel may be encouraged by a movement of one or more of the plurality of wheels 120 when powered by the one or more motors 140.

Additionally, or alternatively, the steerable axle 130 may include a cranking or jacking mechanism (not shown) that operates to lift and lower the steerable axle 130. In one or more embodiments, the cranking or jacking mechanism may be electric-powered and an operation thereof automated and/or controlled by the AEP trailer system 100. In a non-limiting example, the cranking or jacking mechanism may be operated during one or more automated tethering or automated hitching operations in which the AEP trailer system 100 operates to automatically hitch its coupler to a tow hitch or tethering mechanism of a tow entity. In some embodiments, the jacking mechanism may enable or semimanual (e.g., external electronic jacking interface of the AEP trailer) or manual intervention (e.g., a manual crank) for lifting and/or lowering a coupler of the AEP trailer system 100 to a tethering mechanism.

1.40 Electric Motors

The one or more electric motors 140 of the AEP trailer system 100 preferably function to produce torque for turning one or more of the plurality of wheels 120, the steerable axle 130, and/or the jacking mechanism of the AEP trailer system 100. In one or more embodiments, the one or more electric motors 140 may be powered by energy outputs of the battery subsystem 145 to generate the torque outputs for operating one or more mechanisms (e.g., wheels, jack, etc.) of the AEP trailer system 100.

As mentioned above, the one or more motors 140 in varying embodiments may be arranged along the chassis 110 and/or the plurality of wheels 120 in any suitable manner for achieving a steering and driving of the AEP trailer system 100. In one implementation, the one or more motors 140 may be arranged along an axle shared between pairs of wheels. In another implementation, the one or more motors 140 may be arranged on distinct, independent axles that uniquely power each respective wheel of the plurality of wheels 120. In a further implementation, a combination of the aforementioned implementations may be combined to optimize driving and/or steering operations of the AEP trailer system 100.

Moreover, in yet another implementation, the one or more motors 140 may be coupled to an active differential module or system. In this implementation, the active differential module or system may actively (and selectively) direct torque generated by the one or more motors 140 to one or more of the plurality of wheels 120. For instance, in a non-limiting example, the active differential module or system may control which of the plurality of wheels 120 receive the torque generated by the one or more motors 140 and which of the plurality of wheels 120 do not receive the torque generated by the one or more motors 140.

1.45 Battery Subsystem

The battery subsystem 145 is preferably in electrical communication with each of the electric-powered components of the AEP trailer system 100 and may function to provide energy outputs to the electric-powered components based on control signals from the autonomous trailer control subsystem 160.

Additionally, or alternatively, the battery subsystem 145 may include a battery stack that may include a plurality of distinct batteries or energy storage devices. In one or more embodiments, the battery stack may include a plurality of distinct batteries in which subsets of one or more batteries may be dedicated to a distinct electric-powered component of the AEP trailer system 100. In this way, power consumption of various electronic components of the AEP trailer system 100 and/or the over consumption of the electric-powered components may be intelligently managed to increase safety and/or efficiency of the AEP trailer system 100.

1.50 Sensing Devices

The sensor suite 150 preferably functions to observe and/or collect data (e.g., sensor data) from one or more components of the AEP trailer system 100, an environment and/or circumstances surrounding the AEP trailer system 100 and/or a tow entity, a coupler component and/or coupled subsystem, and/or the like. According, in one or more embodiments, the sensor suite 150 may function to periodically and/or continuously measure a behavior of static and dynamic objects in an environment of the AEP trailer system 100, a behavior of a tow entity (in either a tethered or untethered state) and measure self-behavior.

In a preferred embodiment, the sensor suite (e.g., computer vision system, LIDAR, RADAR, ultrasonic sensors, wheel speed sensors, IMU, GPS, cameras, etc.) 150 or onboard sensors that are in operable communication with the autonomous trailer control subsystem 160.

The sensor suite 150 preferably includes sensors used to perform autonomous trailer operations (such as automated tethering, autonomous driving, and/or the like) and data capture regarding the circumstances surrounding the AEP trailer system 100 as well as data capture relating to operations of the AEP trailer system 100 but may additionally or alternatively include sensors dedicated to detecting maintenance needs of the AEP trailer system 100. For example, the sensor suite 150 may include motor feedback and/or diagnostic sensors or an exterior pressure sensor strip. As another example, the sensor suite 150 may include sensors dedicated to identifying a position of a tethering nexus (e.g., a tow hitch or the like) relative to a position of the AEP trailer system 100.

1.60 Autonomous Trailer Control Subsystem

The AEP trailer system 100 preferably includes an autonomous trailer control subsystem 160 (e.g., an onboard computer operably integrated with the AEP trailer) but can additionally or alternatively be decoupled (e.g., not onboard) from the AEP trailer system 100 (e.g., a user mobile device operating independent of the autonomous trailer). That is, in one or more embodiments, parts of the autonomous trailer control subsystem 160 may be operated and/or performed remotely by one or more external computing systems (e.g., a mobile user device, remote cloud computing system) that be may in operable control communication (e.g., via a network, short-range communication system, and the like).

Additionally, or alternatively, the autonomous trailer control subsystem 160 may include a processing system (e.g., graphical processing unit or GPU, central processing unit or CPU, or any suitable processing circuitry) as well as memory and a sensor fusion system. The memory can be short term (e.g., volatile, non-volatile, random-access memory or RAM, etc.) and/or long term (e.g., flash memory, hard disk, etc.) memory.

In one or more embodiments, the sensor data fusion system may function to synthesize and process sensor data for deriving to artifacts (e.g., load measurements, tow vehicle acceleration/braking, and the like), predicting the presence, location, classification, and/or path of objects and features of the environment of the AEP trailer system 100. In various embodiments, the sensor data fusion system may function to incorporate data from multiple sensors and/or data sources, including but not limited to cameras, LIDARS, radars, remote data feeds (Internet-based data feeds, weather feeds, and the like), and/or any number of other types of sensors.

As discussed below, the AEP trailer system 100 may additionally include a trailer communication interface 170 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, trailer pin connectors (e.g., 4 pin, 7 pin, or the like), or any other suitable wired data communication system or protocol), sensors, and/or a data transfer bus (e.g., CAN, FlexRay). In a preferred embodiment, the autonomous trailer control subsystem 160 may operate to interact with and/or operably control any or one or more of the identified components or modules described herein.

Additionally, or alternatively, the AEP trailer system 100 may be in operable communication with a remote or disparate computing system that may include a user device (e.g., a mobile phone, a laptop, etc.), a remote server, a cloud server, or any other suitable local and/or distributed computing system remote from the AEP trailer system 100. The remote computing system may preferably be connected to one or more systems of the autonomous trailer through one or more data connections (e.g., channels), but can alternatively communicate with the AEP trailer system in any suitable manner.

The autonomous trailer control subsystem 160 preferably functions to control the AEP trailer system 100 and process sensed data from a sensor suite (e.g., a computer vision system, LIDAR, flash LIDAR, wheel speed sensors, GPS, etc.) of the AEP trailer system 100 and/or other sensors to determine states of the AEP trailer system 100 and/or states of agents in an operating environment of the AEP trailer system 100. Based upon the states of the autonomous trailer and/or agents in the operating environment and programmed instructions, the autonomous trailer control subsystem 160 preferably modifies or controls behavior of AEP trailer system 100.

The autonomous trailer control subsystem 160 is preferably a general-purpose computer adapted for I/O communication with AEP trailer control systems and sensor systems but may additionally or alternatively be any suitable computing device.

Additionally, or alternatively, the autonomous trailer control subsystem 160 is preferably connected to the Internet via a wireless connection (e.g., via a cellular link or connection). Additionally, or alternatively, the autonomous trailer control subsystem 160 may be coupled to any number of wireless or wired communication systems.

The positioning system processes sensor data along with other data to determine a position (e.g., a local position relative to a map, an exact position relative to lane of a road, AEP trailer heading, velocity, etc.) of the AEP trailer system 100 relative to the environment. The guidance system processes sensor data along with other data to determine a path for the AEP trailer system 100 to follow.

In various embodiments, the controller may function to implement machine learning techniques to assist the functionality of the controller, such as feature detection/classification, obstruction mitigation, route traversal, mapping, sensor integration, ground-truth determination, and the like.

Additionally, or alternatively, in some embodiments, the autonomous trailer control subsystem may include a vision perception system or module that include extensible machine learning-based objection classification sub-modules trained for predicting and/or classifying varying areas (e.g., a rear) of a tow entity, a position of tethering nexus, and/or the like.

Additionally, or alternatively, the vision perception system or module may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the AEP trailer system 100. Further, any suitable model (e.g., machine learning, non-machine learning, etc.) may be implemented in the various systems and/or methods described herein.

1.70 Trailer-to-Tow Entity Communication Interface

The trailer communication interface 170 preferably enables the AEP trailer system 100 to communicate and/or exchange data with systems, networks, and/or devices external to and/or that may be independent of the AEP trailer system 100. Preferably, the trailer communication interface 170 enables one or more entity devices and/or user devices/applications to communicate directly with the AEP trailer system 100. The trailer communication interface 170 preferably includes one or more of a cellular system (or any suitable long-range communication system), direct shortwave radio, or any other suitable short-range communication system.

2. Method for Automated Tethering of an Autonomous Trailer to a Tow Nexus

Figure 2:
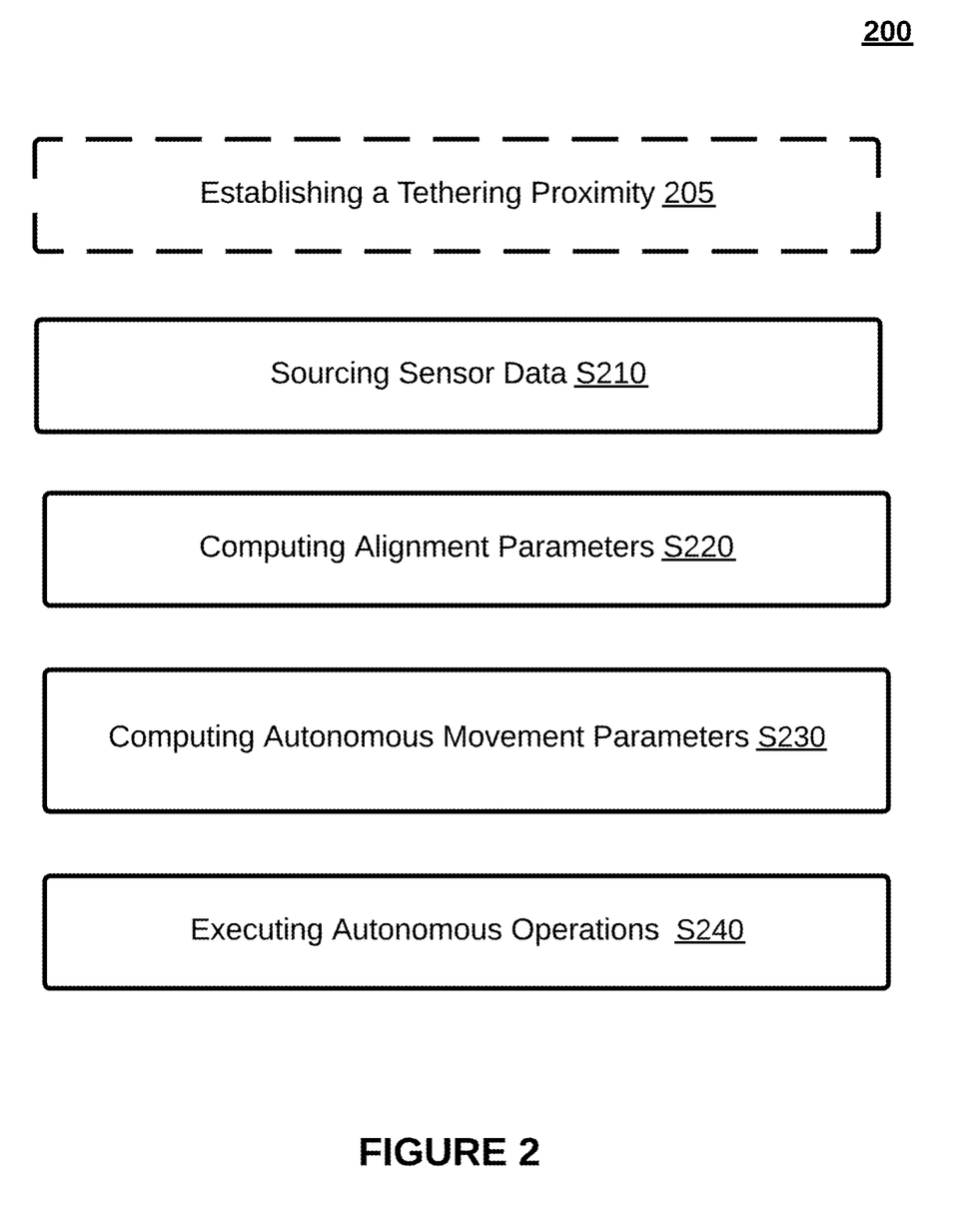
FIG. 2 illustrates an example method 200 in accordance with one or more embodiments of the present application.

As shown by reference to FIG. 2, the method for autonomously tethering an autonomous electric trailer to a tow vehicle includes establishing a tethering proximity S205, identifying sensing data S210, computing alignment parameters S220, computing autonomous movement parameters S230, and executing autonomous operation instructions S240.

2.05 Vehicle-to-Trailer Tethering Proximity

S205, which includes establishing a tethering proximity, may function to initialize an automated pairing and/or automated tethering of an automated electric-powered (AEP) trailer and a remote tethering nexus (e.g., a tow hitch or the like) based on a proximity of the AEP to the tethering nexus. In one or more embodiments, a tethering proximity preferably relates to a defined n-dimensional distance between an AEP and tethering nexus within which the AEP trailer may autonomously steer and/or drive itself into a pairing or tethering position with the tethering nexus. That is, in one or more embodiments, an ability of the AEP trailer to autonomously move into a position for automating a coupling of the AEP trailer to a tethering nexus may be predicated on whether the AEP trailer is within a close enough distance or a sufficiently close distance to the tethering nexus to allow the AEP trailer to accurately, safely, and autonomously move towards the tethering nexus to automate at least part of a pairing or coupling of the AEP trailer to the tethering nexus.

A tethering nexus, as referred to herein, preferably relates to a mechanism, device, and/or system to which a coupling component (e.g., tongue coupler and the like) may establish an effective towing connection. In some embodiments, such mechanism, device, and/or system may preferably be attached to a chassis or body of a towing entity (e.g., a vehicle). Thus, in a non-limiting example, a tethering nexus may include, but should not be limited to, a tow hitch, a tow hitch ball, a tow hitch receiver, a tow bar, a trailer hitch, a tow pin, a tow loop, a towing pintle, and/or the like.

Pairing or Tethering Partner Identification

In one or more embodiments, establishing a tethering proximity may include identifying a pairing or tethering partner of the AEP trailer. The pairing or tethering partner, in some embodiments, may include or relate to a towing vehicle having a tethering nexus. However, the pairing or tethering partner, in some circumstances, may be the tethering nexus per se.

In one or more embodiments, identifying the pairing or tethering partner may include selecting a target pairing partner. In one embodiment, the selection of the target pairing partner may be performed by a user via providing one or more pairing inputs to a user interface of a remote device, a pairing interface of the AEP trailer, or by remotely (i.e., via a remote control) or manually arranging the AEP trailer and/or the tethering nexus in a predetermined manner or distance that allows the AEP trailer to positively identify its pairing partner based on its relative arrangement to a target tethering nexus. For instance, in a non-limiting example, the AEP trailer may obtain or receive one or more inputs from a user indicating the desired paring partner for the AEP trailer, such as a license plate number of the desired paring partner, a make or model of the desired pairing partner, a color of the desired pairing partner, and/or the like.

In turn, the AEP trailer may implement one or more vision-based machine learning models to identify (e.g., detect) an object or entity within a scene of the AEP trailer having such characteristics and select that object or entity as the target pairing partner for the AEP trailer.

Additionally, or alternatively, S205 may function to enable the AEP trailer to compute or predict one or more pairing candidates that may be presented, via a pairing user interface or the like, to a user that may select and/or confirm one of the one or more pairing candidates. For instance, in a non-limiting example, the AEP trailer may function to capture one or more images of one or more objects or entities proximal to the AEP trailer and transmit these one or more images to a user for review, selection, or confirmation. Thus, in some embodiments, a user input confirming or selecting an image of a distinct object may cause the AEP trailer to select (or identify) that object or entity as the target pairing partner for the AEP trailer.

In a varying example, the AEP trailer may function to capture an image of a license plate associated with one or more objects or entities proximal to the AEP trailer and, in turn, transmit these one or more images to a user for review, selection, or confirmation. Thus, in some embodiments, a user input confirming or selecting an image of a distinct license plate may cause the AEP trailer to select (or identify) the object or entity associated with that distinct license plate as the target pairing partner for the AEP trailer. It shall be recognized that the method 200 may communicate with one or more external systems to aid the AEP trailer or the user in selecting or identifying a target pairing partner, such as a department of motor vehicles (DMV) database or the like.

As described in more detail herein, in a preferred implementation, an identification of a target pairing partner may be performed by the AEP trailer using computer vision-based perception. In such embodiments, the computer vision-based perception of the AEP trailer may be implemented using one or more trained machine learning models (e.g., convolution neural networks) that may be specifically trained to predict and/or classify a suitable tethering partner for the AEP trailer. That is, in one or more embodiments, a vision-based machine learning algorithm may be trained using a corpus of data samples comprising sample images of tethering partners (e.g., tow hitches and the like), such that once the vision-based machine learning algorithm is trained, the resulting vision-based machine learning model, when operated by the AEP trailer, may function to classify and identify a tethering partner or tethering nexus.

Pairing Proximity Threshold

In one or more embodiments, establishing the tethering proximity may further include identifying whether the AEP trailer satisfies a pairing proximity threshold. In such embodiments, the pairing proximity threshold preferably relates to a maximum distance between an AEP trailer and a target pairing candidate (e.g., a tethering nexus) that, if exceeded, may disable an automated pairing or tethering of the AEP trailer to the target pairing candidate. Stated differently, the pairing proximity threshold, if satisfied (e.g., at or below the maximum distance), may enable or cause an automated execution of pairing or tethering operations of the AEP trailer.

Accordingly, in some embodiments, identifying whether the pairing proximity threshold is satisfied includes computing a pairing distance between the AEP trailer and a towing entity. Preferably, S205 may function to identify an n-dimensional coordinate or position of a target tethering nexus and an n-dimensional coordinate of a coupler (e.g., towing coupler) of the AEP trailer and compute a pairing distance based on a difference between the n-dimensional coordinates of the coupler of the AEP trailer and the tethering nexus.

In one embodiment, if a computed pairing distance satisfies the pairing proximity threshold, S205 may function to identify or set the AEP trailer in a first state, such as setting the AEP trailer to an in-pairing position state (i.e., a pairing ready state). In such embodiments, when the AEP trailer may be in an in-pairing position state, S205 may function to generate a pairing signal that may cause an execution of an automated workflow or automated tethering sequence. Alternatively, if a computed pairing distance does not satisfy the pairing proximity threshold, S205 may function to identify or set the AEP trailer in a second state, such as setting the AEP trailer to an out-of-pairing position state. In the out-of-pairing position state, S205 may function to generate one or more signals for reporting (or indicating) that automated tethering or pairing may not yet be enabled because of a failed pairing proximity.

2.10 Sensing Data for Automated Tethering

S210, which includes sourcing sensing data, may function to identify or collect one or more streams of sensing data from one or more sensing sources (i.e., sensors). In one or more embodiments, the one or more sensors may include sensors positioned or mounted on the AEP trailer (i.e., onboard sensors). In a variation of such embodiments, S210 may include at least one sensor arranged on a target towing entity or a target tethering nexus to improve a fidelity and/or robustness of the sensing data sourced for autonomous tethering and/or autonomous driving operations of the AEP trailer. Additionally, or alternatively, the one or more sensing sources may include one or more remote data feeds (e.g., weather feed, traffic feed, etc.), a remote autonomous trailer service or platform (e.g., remote servers, cloud computing servers, etc. for remotely managing and/or informing an operation of an AEP trailer), and any other suitable sensing source accessible to the AEP trailer.

In one implementation, S210 may function to implement one or more sensors (e.g., one or more cameras) mounted on the AEP trailer to collect sensor data identifying a position of one or more of a coupler of the AEP trailer and a target tethering nexus of a towing entity or the like. In this implementation, the one or more sensors may include one or more onboard cameras in which the respective field of view for each camera may be angled to include both the coupler of the AEP trailer and a trailer tow hitch or the like of a tow vehicle. In this way, the one or more sensors may collect data that may identify a relative position of the coupler of the AEP trailer and the tethering nexus (of a tow vehicle or the like).

In a second implementation, sourcing sensor data may include implementing a combination of onboard sensors mounted on the AEP trailer and one or more remote (off-board) sensors mounted on a proximate to the tethering nexus. In this second implementation, S210 may function to collect distinct streams of sensor data from each of the onboard sensors and remote sensors to define a corpus of sensor data for one or more downstream computations (e.g., S220-S240 and the like). In one example, a remote sensor or offboard sensor may be positioned with a field of view of at least the tethering nexus while the one or more onboard sensors may function to collect sensor data associated with a position or arrangement of the AEP trailer. It shall be recognized that in a preferred embodiment, sensor data as referred to herein may include, but should not be limited to, any data observed or collected by a sensor suite of a target AEP trailer (or like vehicle), a tow vehicle, an external sensor system (e.g., a mobile device), a third-party sensing system, and/or the like.

In a third implementation, a pairing target such as a tethering nexus and/or towing vehicle may have a distinct positioning indicia (e.g., a visual aid, fiducials, and/or the like) applied to a visible or observable surface. In such embodiments, S210 may function to source sensor data by observing a position of the distinct positioning indicia on either or both of the tethering nexus and towing vehicle.

In a fourth implementation, a pairing target such as a tethering nexus and/or towing vehicle may emit a positioning signal or a beacon. In such embodiments, S210 may function to implement one or more sensors that identify and/or observe the beacon contemporaneously with an automated trailer-to-vehicle tethering process of the AEP trailer.

2.20 AEP Trailer-to-Tether Alignment Parameters

S220, which includes computing alignment parameters, may function to compute alignment parameters and/or autonomous control instructions for creating an alignment between the AEP trailer and tethering nexus. That is, upon establishing a tethering proximity and/or detecting that the AEP trailer may be in an out-of-alignment state with respect to a target tethering nexus, S220 may function to generate steering and/or motor control instructions to cause the AEP trailer to autonomously move into an in-alignment state. Trailer-to-vehicle or trailer-to-tether alignment, as referred to herein, generally relates to an arrangement between a position of a coupler of an AEP trailer and a tethering nexus (of a tow vehicle) that preferably positions the coupler of the AEP and the tethering nexus in a center of a sensing environment. In a non-limiting example, a trailer-to-tether alignment may be achieved when a position of a tow hitch of a tow vehicle and a tongue coupler of an AEP trailer are arranged in a center of image data sensed by one or more onboard cameras of the AEP trailer.

In a first implementation, S220 may function to compute alignment parameters based on an n-dimensional position of the tethering nexus. In this first implementation, S220 may function to compute an n-dimensional position of a target tethering nexus based on sensor data. In such embodiments, computing the n-dimensional position of the target tethering nexus may include measuring and/or calculating a three-dimensional position of the tethering nexus that preferably includes an X-Y coordinate of the tethering nexus and a Z coordinate (i.e., a height value relative to a driving surface). In some embodiments, measuring the n-dimensional position of the tethering nexus may include converting a position and size of a tethering nexus and/or tow vehicle within the sensor data (e.g., camera images of tow vehicle) into a relative position and distance of the tethering nexus from the AEP trailer.

Additionally, or alternatively, the alignment parameters preferably include computer-executable instructions that, when executed, control one or more of a battery stack (e.g., electric outputs), one or more motors (for torque generation, wheel adjustments), steering components (for wheel and/or axle/caster wheel adjustments), lifting components (e.g., a jack), and/or any component of the AEP trailer that may be manipulated electronically. Accordingly, S220 may function to compute alignment parameters that may include steering and/or motor control instructions that, when executed, generates propulsion in the one or more motors for moving the one or more wheels of the AEP trailer into a trailer-to-tether alignment.

In a second implementation, S220 may function to compute alignment parameters based on alignment signals emitted by a target tethering nexus, tow vehicle, and/or a beacon associated with the tethering nexus. In this second implementation, the alignment signals may include two or more infrared beams or the like emitted from a (single) beam source (e.g., the tethering nexus), which may form alignment traveling boundaries, such as emissions that define a V-shape or a shape substantially similar to a V-shape. Accordingly, computing alignment parameters may include calculating a vertex of the V-shaped emissions and generating alignment control instructions that, when executed, cause the AEP trailer to steer its coupler into alignment with the vertex of the V-shaped emissions.

2.30 AEP Trailer-to-Tether Driving Control Parameters

S230, which includes computing trailer-to-tether autonomous driving parameters, may function to generate autonomous trailer driving instructions that, when executed, cause the AEP trailer to autonomously steer and drive to a tethering point for an automated tethering or connection of a coupler of the AEP trailer to a target tethering nexus.

In one or more embodiments, the automated tethering arrangement, AEP trailer coupler-to-tether arrangement, or connection point generally refers to a position and/or arrangement in which a coupler of an AEP trailer and a tethering nexus may be in an imminent coupling alignment, such that the coupler of the AEP trailer and the tethering nexus may be in an overlapping arrangement in which the coupler is positioned over a top surface of the tethering nexus. In such embodiments, a movement of the coupler of the AEP trailer in a direction normal or perpendicular to and toward a surface of tethering nexus may cause the coupler and the tethering nexus to physical contact or connect. That is, in the automated tethering arrangement the physical pairing or mating of the coupler of the AEP and the tethering nexus of a tow vehicle may be achieved by automatically reducing a height of the coupler until the coupler physically engages and/or encapsulates part or all of the tethering nexus. Additionally, or alternatively, the AEP trailer coupler-to-tether arrangement may be achieved when the coupler of the AEP trailer is moved within a threshold distance of the tethering nexus (e.g., 6 inches, 1 foot, 1.5 feet, 2 feet, 3 feet, 6 feet, etc. from the tethering nexus). It shall be noted that, in some portions of the disclosure, the AEP trailer may be described as being adjacent or proximal to the tethering nexus when the coupler of the AEP trailer is moved within the threshold distance of the tethering nexus.

Alternatively, in some embodiments, the automated tethering arrangement or connection point may include a position in which a coupler of the AEP trailer and a tethering nexus of a tow vehicle may be in axial alignment. In such embodiments, a movement of the coupler of the AEP trailer along a shared or common axis (e.g., a central axis of both the AEP trailer and tethering nexus) may place the coupler and the tethering nexus in physical contact connection.

Additionally, or alternatively, S230 may function to generate a route plan that may include one or more of a starting condition (e.g., tethering proximity established, trailer-to-tether alignment, etc.), driving behavior policy (e.g., path estimation, driving speed, steering, etc.), and a stopping condition (e.g., automated tethering arrangement) that may enable the AEP trailer to successfully and autonomously travel to the tethering nexus to establish an automated tethering arrangement that enables the AEP to physically connect the AEP coupler to a target tethering nexus.

Accordingly, in one or more embodiments, computing trailer-to-tether autonomous driving parameters may include generating (i) motor control instructions which may influence driving and/or steering, (ii) steering instructions to influence a moving direction, and (iii) braking instructions to influence discontinuation or reduction in a velocity of a motion of an AEP trailer.

In one implementation, the AEP trailer may include at least one wheel on each side that includes a motor or is controlled by an independent motor that produces torque for propulsion. In such embodiments, generating the motor control instructions may include generating distinct motor control instructions for each motor at either side of the AEP trailer. In such embodiments, S230 may function to generate motor control instructions for generating torque for both steering and propulsion. In a non-limiting example, to affect a steering of an AEP trailer, S230 may function to generate motor control instructions that produces a torque in a first motor of a first wheel, such as a right wheel, that is greater that a torque produced in a second motor of a second wheel, such as a left wheel. In such example, the generation of excess torque on one side of the AEP trailer may result in a steering affect depending on the direction of excess torque. In this example, a chassis of the AEP trailer may include a steerable axle or caster wheel that enables a steering of the AEP trailer based on the generation of the excess torque.

In another implementation, one or more pairs of corresponding wheels defining a left and right wheel pair of the AEP trailer may be driven by a same motor and the AEP trailer may further include a steerable axle or a caster wheel that may be actively operated or driven for steering a directional movement of the AEP trailer towards a tethering nexus. In such embodiments, S230 may function to generate motor control instructions that, when executed, generate propulsion in the wheels of the AEP trailer and further generate steering instructions that, when executed, control a steering direction of the steerable axle or caster wheel of the AEP trailer. In a variation of this implementation, the AEP trailer may not include an active steering axle. In such variation, an autonomous steering operation of the AEP trailer may be performed or achieved based on a control and application of differential braking of a pair of opposing (e.g., left vs. right wheel) wheels of the AEP trailer. In such embodiments, a single motor may provide a constant or same torque to the pair of opposing wheels while a braking operation is applied to one wheel of the pair of opposing wheels thereby enabling a movement of the second wheel of the pair of opposing wheels and, further, a steering of the AEP trailer in a rotational manner since the one wheel having a braking operation applied thereto may act as a pivot for a rotational movement or steering of the AEP trailer.

Additionally, or alternatively, generating autonomous trailer driving instructions may include generating braking instructions. In one or more embodiments, S230 may function to generate dynamic braking instructions in response to environmental conditions and/or the detection of dynamic or static objects along a route of the AEP trailer. In a preferred embodiment, S230 may function to generate braking instructions based on achieving a stopping condition of a route plan for the AEP trailer. That is, contemporaneous with (e.g., before and during) an arrival of the AEP trailer to an automated tethering arrangement or position with the tethering nexus, S230 may generate braking instructions that, when executed, causes the AEP trailer to autonomously apply braking forces to one or more of its wheels.

Additionally, or alternatively, generating autonomous trailer driving instructions may include generating jack control instructions that, when executed by the AEP trailer, cause a change in a height control mechanism (e.g., a jack) of the AEP trailer. In one or more embodiments, a height control mechanism may be arranged along or near a steerable axle of the AEP trailer. In such embodiments, S230 may function to compute jack control instructions that enable the heigh control mechanism of the AEP trailer to clear the tethering nexus and further, enable the coupler of the AEP trailer to arrange itself in an automated tethering arrangement, such as being arranged over a top surface of the tethering nexus. In some embodiments, the jack control instructions may enable an axial alignment between the tethering nexus and the coupler of the AEP trailer to enable a successful coupling.

2.40 Autonomous Tethering

Figure 3:
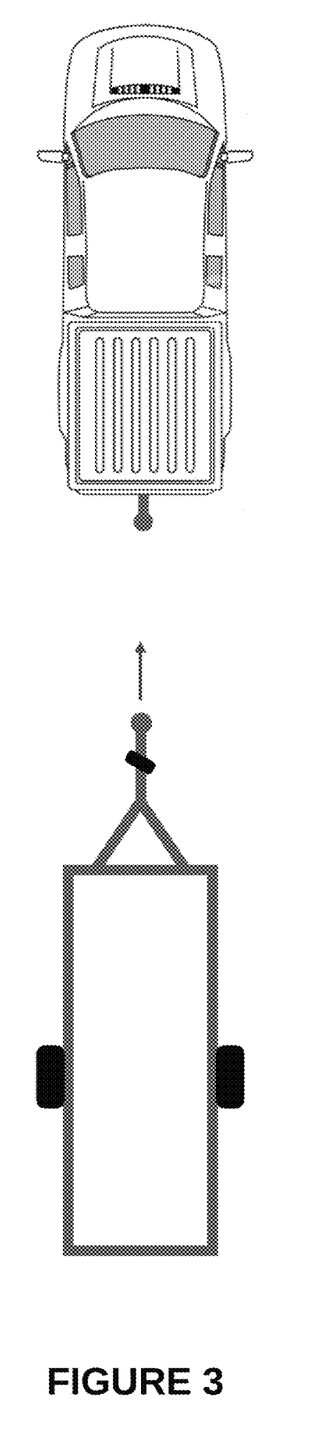
FIG. 3 illustrates an example schematic for automated tethering in accordance with one or more embodiments of the present application.

S240, which includes automatically tethering an AEP trailer to a tethering nexus, may function to execute a composition of autonomous trailer operating controls and/or instructions that enable the AEP trailer to automatically (i.e., without human intervention) tether a coupler of the AEP trailer to a separate tethering nexus (e.g., a tow hitch ball or the like of a tow vehicle), as shown by way of example by FIG. 3. In a preferred embodiment, an automated tethering operation may be based on the AEP trailer sensing a position of a target tethering nexus within a tethering proximity and generating autonomous control and tethering instructions (based on the sensing) that, when executed by the AEP trailer, causes the AEP trailer to autonomously drive and/or steer into an automated tethering position in which the coupler of the AEP trailer system may come into physical contact and connect to the target tethering nexus.

In one or more embodiments, the AEP trailer starting in an un-tethered state may function to compute a position of a target tethering nexus based on sensor data collected by one or more sensors of the AEP trailer. In such embodiments, S240 may function to calculate a position and/or size of a tethering nexus (or tow entity) and algorithmically convert the position and/or size data into relative position and distance information (e.g., coordinates) of the tethering nexus from a coupling device of the AEP trailer. As described herein, the relative position and distance information may be used to establish a tethering proximity and/or perform an alignment of the AEP trailer to the tethering nexus.

Additionally, or alternatively, the sensor data and/or artifacts derived from sensor data may be streamed or used as input to an onboard computer system of the AEP trailer, which may, in turn, generate autonomous tethering instructions. The autonomous tethering instructions may, in such embodiments, include control instructions for directing power output from one or more batteries of the AEP trailer to drive one or more electric motors that operate the wheels of the AEP trailer. Stated differently, S240 may function to compute driving and/or steering instructions that, when executed, enable the AEP trailer to autonomously drive and steer from an un-tethered state to a tethering state and, further, into a tethered state.

In an un-tethered state, a coupler of the AEP trailer may not be physically connected or tethered to a tethering nexus, such as a tow hitch of a tow vehicle. In a tethering state, a coupler of the AEP trailer may be in a position for imminent connection with a target tethering nexus. An imminent connection, as referred to herein, preferably relates to a state in which a coupler of the AEP trailer has been autonomously moved into a position (e.g., coupler overlapping the tethering nexus) in which an execution of control instructions by the AEP trailer for controlling a height of the coupler of the AEP trailer may likely create physical contact and/or a connection between the coupler and a target tethering nexus. In a tethered state, as referred to herein, a coupler of the AEP trailer and a target tethering nexus may be in physical contact and/or connection (e.g., the coupler is locked into place with the tethering nexus).

In one or more embodiments, if or when it is determined that a coupler of the AEP trailer may be in a tethering state with a tethering nexus of a tow entity or the like, S240 may function to generate and transmit a coupling (pairing or tethering) signal that causes a cranking and/or jacking mechanism at or near the coupler of the AEP trailer to automatically adjust a height of the coupler until a physical engagement between the coupler and the tethering nexus is achieved. In one or more embodiments, S240 may function to trigger a stopping condition that terminates the height adjustment based on sensing one or more loads and/or detecting a successful connection (or contact) between the coupler of the AEP trailer and the target tethering nexus.

Additionally, or alternatively, it shall be recognized that an autonomous tethering of a coupler of the AEP trailer and a target tethering device may be initiated, by the AEP trailer, in any suitable manner including, but not limited to, by user input onto an external trailer interface, user input or command to a remote device (e.g., a mobile device having an AEP trailer application), an input interface of a tow entity, and/or the like.

Additionally, or alternatively, S240 may function to terminate, pause, and/or stop an automated tethering between an AEP trailer and a target tethering nexus based on varying circumstances that may cause the automated tethering to be unsuitable, unsafe, and/or dangerous. For instance, in a case of a potential collision with an object, S240 may function to automatically terminate an automated tethering operation to prevent the AEP trailer from a likely collision with an object.

It shall be recognized that, in various embodiments, an automated tethering operation and/or process, including autonomous driving operations, of the AEP trailer may include an iterative process, which include one or more feedback loops or systems that may continuously assist the autonomous driving and/or autonomous tethering computations of the AEP trailer. In such embodiments, one or more of the steps of the method 200 (i.e., S205-S240) may be performed one or more instances (or in a repeating manner) either sequentially or non-sequentially to support a generation of autonomous control instructions for driving, steering, and/or the automated tethering of the AEP trailer to a tethering nexus or the like.

It shall also be recognized that while in various embodiments the AEP trailer includes a trailer that is typically designed to be hauled or towed, in some embodiments, the AEP trailer may be a recreational vehicle (RV) or recreational trailer (e.g., the RV may serve as a mobile home with wheels, a temporary dwelling with wheels, place of business, and/or the like). In one or more embodiments, the RV or recreational trailer may include internal space as sleeping or living quarters for humans and/or pets.

Thus, in some embodiments, the method 200 may function to move the AEP trailer from an untethered state to the tethering state based at least on detecting or determining that the AEP trailer is in an undeployed or a movable state. In such embodiments, the AEP trailer may function to remain in the untethered state until the AEP trailer detects or determines that the AEP trailer is no longer in a deployed or immovable state.

In some embodiments, the AEP trailer may be in the deployed or immovable state when the method 200 detects that one or more AEP trailer objects are (currently) in-use or deployed. For instance, in a non-limiting example, the method 200 may detect or determine that the AEP trailer is in a deployed or immovable state when a door of the AEP trailer is detected in an open state, one or more entities are detected in the AEP trailer, one or more stairs of the AEP trailer are detected in an expanded state, an awning of the AEP trailer is an expanded state, one or more AEP trailer utility components (e.g., charging components, water utilities, and/or the like) are determined to be connected to one or more external sources, and/or the like.

Conversely, in some embodiments, the AEP trailer may be in the undeployed or movable state when the method 200 detects that one or more AEP trailer objects are undeployed (e.g., not in-use). For instance, in a non-limiting example, the method 200 may detect or determine that the AEP trailer is in the undeployed or movable state when a door of the AEP trailer is detected in a closed state, one or more stairs of the AEP trailer are detected in a retracted state, an awning of the AEP trailer is in a retracted state, one or more AEP trailer utility components (e.g., charging components, water utilities, and/or the like) are determined to be disconnected from the one or more external sources, and/or the like.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for implementing an automated tethering of an autonomous electric-powered trailer and a tow vehicle, the method comprising:
    identifying, via one or more computers, a tow vehicle for an autonomous electric-powered (AEP) trailer;
    identifying, by the AEP trailer, an n-dimensional position of a tow hitch of the tow vehicle based on an assessment of sensor data;
    computing, via the one or more computers, a set of automated tethering instructions based on the identifying the n-dimensional position of the tow hitch of the tow vehicle, wherein:
        (1) a first subset of the automated tethering instructions, when executed, causes the AEP trailer to autonomously maneuver into a state of alignment with the tow hitch of the tow vehicle; and
        (2) a second subset of the automated tethering instructions, when executed, autonomously maneuvers a steerable axle or a caster wheel positioned along a trailer tongue of the AEP trailer into a target coupler-to-tether arrangement that arranges a tow hitch coupler of the AEP trailer proximal to the n-dimensional position of the tow hitch of the tow vehicle; and
    autonomously tethering, via the one or more computers, the tow hitch coupler of the AEP trailer to the tow hitch of the tow vehicle based on executing the set of automated tethering instructions.

2. The method according to claim 1, wherein:
    the AEP trailer comprises a steering component and one or more distinct motors operatively connected to one or more wheels of the AEP trailer,
    the set of automated tethering instructions at least include:
        (a) one or more motor control instructions for controlling a movement of the AEP trailer via the one or more wheels; and
        (b) one or more steering control instructions for controlling a steering direction of the steering component of the AEP trailer, and
    autonomously tethering the coupler of the AEP trailer to the tow hitch includes:
        operating, via the one or more computers, each motor of the AEP trailer at a target voltage based on the one or more motor control instructions and the one or more steering control instructions.

3. The method according to claim 1, wherein computing the set of automated tethering instructions includes:
    (i) identifying, via the one or more computers, an n-dimensional position of the coupler of the AEP trailer based on the assessment of the sensor data; and
    (ii) computing, via the one or more computers, at least one of (a) one or more motor control instructions, (b) one or more braking control instructions, and (c) one or more steering control instructions that, when executed, causes the n-dimensional position of the coupler to align with the n-dimensional position of the tow hitch.

4. The method according to claim 1, wherein:
    the tow hitch emits an alignment traveling boundary signal, and computing the set of automated tethering instructions include:
        (a) identifying, via the one or more computers, an n-dimensional position of the coupler of the AEP trailer based on the assessment of the sensor data;
        (b) identifying, via the one or more computers, a vertex of the alignment traveling boundary signal; and
        (c) computing, via the one or more computers, at least one of (i) one or more motor control instructions, (ii) one or more braking control instructions, and (iii) one or more steering control instructions that, when executed, causes the n-dimensional position of the coupler to align with the vertex of the alignment traveling boundary signal.

5. The method according to claim 1, wherein:
    the target coupler-to-tether arrangement is achieved when the coupler of the AEP trailer is moved to a pre-determined tether connection point associated with the tow hitch, and
    computing the set of automated tethering instructions include:
        (i) identifying, via the one or more computers, an n-dimensional position of the pre-determined tether connection point associated with the tow hitch;
        (ii) identifying, via the one or more computers, an n-dimensional position of the coupler of the AEP trailer based on the assessment of the sensor data; and
        (iii) computing, via the one or more computers, at least one of (a) one or more motor control instructions, (b) one or more braking control instructions, (c) one or more steering control instructions, and (d) one or more jack control instructions that, when executed, causes the n-dimensional position of the coupler to align with the vertex of the alignment traveling boundary signal.

6. The method according to claim 1, wherein:
the set of automated tethering instructions further include:
(3) a third subset of automated tethering instructions that, when executed, causes the coupler of the AEP trailer to physically connect the coupler of the AEP trailer to the tow hitch.

7. The method according to claim 6, wherein the third subset of automated tethering instructions include one or more jack control instructions that, when executed, causes a movement of the coupler of the AEP trailer from a predetermined tether connection point to the n-dimensional position of the tow hitch.

8. The method according to claim 1, wherein:
the AEP trailer comprises a plurality of motors and a plurality of wheels,
each motor of the AEP trailer operatively controls a distinct wheel of the AEP trailer, and
computing the set of automated tethering instructions includes computing a distinct set of automated tethering instructions for each distinct motor of the AEP trailer.

9. The method according to claim 1, wherein:
the AEP trailer comprises one or more wheel pairs,
each distinct wheel pair is controlled by a distinct motor of the AEP trailer, and
the set of automated tethering instructions define a target propulsion for the distinct motor associated with each distinct wheel pair.

10. The method according to claim 1, wherein:
the AEP trailer is an un-tethered state when the coupler of the AEP trailer is not physically connected to the tow hitch,
the AEP trailer moves from the un-tethered state to a tethering state when the one or more computers are executing the set of automated tethering instructions, and
the AEP trailer moves from the tethering state to a tethered state when the coupler of the AEP trailer is physically connected to the tow hitch.

11. The method according to claim 1, further comprising:
terminating or pausing the autonomous tethering of the coupler of the AEP trailer to the tow hitch based on detecting a potential collision with an object or user intervention.

12. The method according to claim 1, wherein:
autonomously tethering the coupler of the AEP trailer to the tow hitch includes one or more feedback loops,
the one or more feedback loops continuously perform autonomous tethering computations until (a) the coupler of the AEP trailer is physically connected to the tow hitch or (b) a stopping condition is satisfied, and
the one or more feedback loops include:
(i) the identifying the n-dimensional position of the tow hitch,
(ii) the computing the set of automated tethering instructions, and
(iii) the executing the set of automated tethering instructions.

13. The method according to claim 1, wherein identifying the tow vehicle includes:
computing, via the one or more computers, one or more likely tethering partners;
surfacing, via the one or more computers, the one or more likely tethering partners to a user; and
selecting, via the one or more computers, one of the one or more likely tethering partners as the tow vehicle based on a user confirmation input.

14. The method according to claim 1, wherein:
the tow vehicle is automatically selected by the AEP trailer, and
automatically selecting the target tethering partner includes:
(a) detecting, via the one or more computers, a potential tethering partner for the AEP trailer;
(b) computing, via the one or more computers, a distance between the potential tethering partner and the AEP trailer; and
(c) selecting the potential tethering partner as the tow vehicle if the distance satisfies a tethering proximity threshold.

15. The method according to claim 1, wherein:
the tow vehicle is selected by a user, and
selecting the tow vehicle includes:
(i) receiving, via the one or more computers, one or more inputs identifying a target tethering object; and
(ii) selecting, via the one or more computers, the target tethering object as the tow vehicle for the AEP trailer.

16. The method according to claim 1, further comprising:
detecting, via one or more imaging sensors, a current state of alignment between the AEP trailer and the tow hitch, wherein detecting the current state of alignment between the AEP trailer and the tow hitch includes:
(1) capturing, via the one or more imaging sensors, a representation of a scene containing the AEP trailer and the tow vehicle;
(2) detecting, via a machine learning object detection model, the coupler of the AEP trailer and the tow hitch based on model input comprising the representation;
(3) deriving, via the one or more computers, an n-dimensional position of the coupler of the AEP trailer and an n-dimensional position of the tow hitch based on the detecting; and
(4) computing, via the one or more computers, the current state of alignment between the AEP trailer and the tow hitch based on an assessment of the n-dimensional position of the AEP trailer against the n-dimensional position of the tow hitch.

17. A method for implementing an automated tethering of an autonomous electric powered trailer to a tethering partner, the method comprising:
identifying, via one or more computers, a tow vehicle for an autonomous electric powered (AEP) trailer;
identifying, by the AEP trailer, a likely n-dimensional position of a tow hitch of the tow vehicle based on an assessment of sensor data;
computing, via the one or more computers, a set of automated tethering instructions based on the identifying the likely n-dimensional position of the tow hitch, wherein the set of automated tethering instructions, when executed, cause the AEP trailer to:
(1) autonomously maneuver into a state of alignment with the tow hitch of the tow vehicle; and
(2) autonomously maneuver into a target coupler-to-tether arrangement that arranges a coupler of the AEP trailer adjacent to the n-dimensional position of the tow hitch; and
autonomously tethering, via the one or more computers, the coupler of the AEP trailer to the tow hitch based on executing the set of automated tethering instructions.

18. The method according to claim 17, wherein:
the AEP trailer comprises one or more distinct motors operatively connected to one or more wheels of the AEP trailer, the set of automated tethering instructions at least include:
  (i) one or more motor control instructions for controlling, via the one or more wheels, a movement of the AEP trailer and a steering direction of the AEP trailer, and
autonomously tethering the coupler of the AEP trailer to the tow hitch includes:
  operating, via the one or more computers, each motor of the AEP trailer at a target propulsion based on the one or more motor control instructions.

19. The method according to claim 17, wherein:
identifying the likely n-dimensional position of the tow hitch includes computing, via the one or more computers, a likely X-position, Y-position, or Z-position of the tow hitch, and
the AEP trailer and tow hitch are determined to be in the state of alignment when an X-position, Y-position, or Z-position of the AEP trailer aligns with the likely X-position, Y-position, or Z-position of the tow hitch.

20. A method for autonomously tethering an autonomous electric powered trailer to a tethering partner, the method comprising:
identifying, via one or more computers, a tow vehicle for an autonomous electric powered (AEP) trailer, wherein the tow vehicle comprises a tow hitch;
detecting, via the one or more computers, a likely n-dimensional position of the tethering *nexus* based on an assessment of sensor data;
computing, via the one or more computers, a set of automated tethering instructions based on the likely n-dimensional position of the tow hitch; and
autonomously tethering, via the one or more computers, a coupler of the AEP trailer to the tow hitch based on executing the set of automated tethering instructions, wherein autonomously tethering the coupler of the AEP trailer to the tow hitch includes autonomously connecting the coupler of the AEP trailer to the tow hitch of the tow vehicle.

* * * * *